United States Patent
Ohno et al.

(10) Patent No.: US 11,560,150 B2
(45) Date of Patent: Jan. 24, 2023

(54) VEHICLE INTERLOCK SYSTEM

(71) Applicant: Toyota Jidosha Kabushiki Kaisha, Toyota (JP)

(72) Inventors: Mitsuyoshi Ohno, Miyoshi (JP); Makoto Sekizuka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 217 days.

(21) Appl. No.: 16/903,507

(22) Filed: Jun. 17, 2020

(65) Prior Publication Data

US 2021/0053585 A1 Feb. 25, 2021

(30) Foreign Application Priority Data

Aug. 23, 2019 (JP) .............................. JP2019-152868

(51) Int. Cl.
*B60W 50/12* (2012.01)
*B60W 60/00* (2020.01)
*B60W 30/08* (2012.01)
*A61G 3/08* (2006.01)
(Continued)

(52) U.S. Cl.
CPC ............ *B60W 50/12* (2013.01); *A61G 3/006* (2013.01); *A61G 3/0808* (2013.01); *B60R 22/48* (2013.01); *B60W 30/08* (2013.01); *B60W 60/0016* (2020.02); *B60W 60/0018* (2020.02);
(Continued)

(58) Field of Classification Search
CPC ............ B60W 50/12; B60W 60/0018; B60W 2540/103; A61G 3/0808; B60R 22/48; B60R 2022/4816; B60R 2022/4883
See application file for complete search history.

(56) References Cited

U.S. PATENT DOCUMENTS

| 2008/0079252 A1* | 4/2008 | Shutter ............... A61G 3/0808 |
| | | 280/755 |
| 2017/0369031 A1 | 12/2017 | Seyffert et al. |
| 2018/0222441 A1 | 8/2018 | Koase |

(Continued)

FOREIGN PATENT DOCUMENTS

| DE | 102015000664 A1 | 7/2016 |
| JP | H11-028226 A | 2/1999 |

(Continued)

OTHER PUBLICATIONS

U.S. Appl. No. 16/902,647, filed Jun. 16, 2020; Inventors: Makoto Sekizuka et al.

*Primary Examiner* — Alan D Hutchinson
*Assistant Examiner* — Andy Schneider
(74) *Attorney, Agent, or Firm* — Dinsmore & Shohl LLP

(57) ABSTRACT

A vehicle interlock system includes a wheelchair fixing device configured to fix a wheelchair to a vehicle, a seatbelt device having a seatbelt configured such that, an occupant seated in the wheelchair wears the seatbelt, and a control unit. The control unit is configured to limit at least one of an upper limit traveling speed and an upper limit acceleration of the vehicle or output a warning signal, or to output a warning signal while limiting at least one of the upper limit traveling speed and the upper limit acceleration of the vehicle depending on at least one of the following conditions: whether the wheelchair is fixed to the vehicle with the wheelchair fixing device; whether the occupant is wearing the seatbelt; and so forth.

21 Claims, 13 Drawing Sheets

(51) Int. Cl.
 B60R 22/48 (2006.01)
 A61G 3/00 (2006.01)
(52) U.S. Cl.
 CPC .. *B60R 2022/4816* (2013.01); *B60W 2540/01* (2020.02); *B60W 2540/103* (2013.01)

(56) References Cited

U.S. PATENT DOCUMENTS

| | | | | |
|---|---|---|---|---|
| 2019/0111889 | A1* | 4/2019 | Michalke | ................ B60R 22/48 |
| 2019/0241398 | A1* | 8/2019 | Marvin | ................ B66B 5/0012 |
| 2020/0047641 | A1* | 2/2020 | D'Eramo | ................ B60N 2/14 |
| 2021/0146954 | A1 | 5/2021 | Kaji et al. | |

FOREIGN PATENT DOCUMENTS

| | | |
|---|---|---|
| JP | 2001-047969 A | 2/2001 |
| JP | 2007-076631 A | 3/2007 |
| JP | 2015-085068 A | 5/2015 |
| JP | 2018-122822 A | 8/2018 |
| WO | 2018/221350 A1 | 12/2018 |

* cited by examiner

FIG. 4

| CONDITION | | | CONTROL | |
|---|---|---|---|---|
| WHEELCHAIR | WHEELCHAIR FIXATION | SEATBELT | UPPER LIMIT TRAVELING SPEED | UPPER LIMIT ACCELERATION |
| PRESENT | FIXED | WEARING | A (NOT LIMITED) | a (0.3G) |
| | | NOT WEARING | B (30km/h) | b (0.1G) |
| | NOT FIXED | WEARING | C (20km/h) | c (0.1G) |
| | | NOT WEARING | D (TRAVELING NOT ALLOWED) | d (TRAVELING NOT ALLOWED) |
| ABSENT | | | E (NOT LIMITED) | e (NOT LIMITED) |

VEHICLE INTERLOCK SYSTEM

CROSS-REFERENCE TO RELATED APPLICATIONS

This application claims priority to Japanese Patent Application No. 2019-152868 filed on Aug. 23, 2019, which is incorporated herein by reference in its entirety including the specification, drawings and abstract.

BACKGROUND

1. Technical Field

The disclosure relates to a vehicle interlock system.

2. Description of Related Art

Japanese Unexamined Patent Application Publication No. 2007-076631 (JP 2007-076631 A) discloses a safety device that limits a speed of a vehicle when an occupant of the vehicle is not wearing a seatbelt.

Japanese Unexamined Patent Application Publication No. 2001-047969 (JP 2001-047969 A) also discloses a wheelchair fixing device for fixing a wheelchair in a vehicle cabin to a vehicle cabin floor, and a wheelchair seatbelt device having a seatbelt worn by an occupant seated in a wheelchair in the vehicle cabin.

SUMMARY

Even if an occupant seated in a wheelchair is wearing a seatbelt, it is difficult to obtain sufficient occupant restraint performance of the seatbelt at the time of a vehicle collision unless the wheelchair is fixed. Even if the wheelchair is fixed, the occupant restraint performance of the seatbelt cannot be obtained at the time of the vehicle collision unless the occupant seated in the wheelchair is wearing a seatbelt. However, neither of the devices described in JP 2007-076631 A and JP 2001-047969 A has a configuration that takes into consideration controlling the vehicle and issuing a warning under such circumstances.

The disclosure provides a vehicle interlock system that can control a vehicle and issue a warning in consideration of a wheelchair in a vehicle cabin.

An aspect of the disclosure relates to a vehicle interlock system. The vehicle interlock system includes: a wheelchair fixing device provided in a vehicle cabin of a vehicle and configured to fix a wheelchair to the vehicle; a seatbelt device having a seatbelt configured to be worn by an occupant seated in the wheelchair; and a control unit. The control unit is configured to limit at least one of an upper limit traveling speed and an upper limit acceleration of the vehicle or output a warning signal, or to output the warning signal while limiting at least one of the upper limit traveling speed and the upper limit acceleration of the vehicle depending on at least one of the following conditions: (1) whether there is the wheelchair in the vehicle cabin; (2) which of a front and a rear of the vehicle the wheelchair is facing toward; (3) whether the wheelchair is fixed to the vehicle with the wheelchair fixing device; and (4) whether the occupant is wearing the seatbelt.

According to the aspect of the disclosure, the control unit limits at least one of the upper limit traveling speed and the upper limit acceleration of the vehicle or outputs the warning signal, or the control unit outputs the warning signal while limiting at least one of the upper limit traveling speed and the upper limit acceleration of the vehicle depending on at least one of: whether there is the wheelchair in the vehicle cabin; which of a front and a rear of the vehicle the wheelchair is facing toward; whether the wheelchair is fixed to the vehicle with the wheelchair fixing device; and whether the occupant is wearing the seatbelt. Thus, it is possible to control the vehicle and/or issue a warning in consideration of a wheel chair in a vehicle cabin.

In the above aspect, the control unit may be configured to limit the upper limit traveling speed such that the upper limit traveling speed of the vehicle when the wheelchair is not fixed to the vehicle with the wheelchair fixing device and the occupant is not wearing the seatbelt is lower than the upper limit traveling speed of the vehicle when the wheelchair is fixed to the vehicle with the wheelchair fixing device and the occupant is not wearing the seatbelt.

In the above aspect, the control unit may be configured to limit the upper limit traveling speed such that the upper limit traveling speed of the vehicle when the wheelchair is not fixed to the vehicle with the wheelchair fixing device and the occupant is not wearing the seatbelt is lower than the upper limit traveling speed of the vehicle when the wheelchair is not fixed to the vehicle with the wheelchair fixing device and the occupant is wearing the seatbelt.

With the above configuration, the upper limit traveling speed of the vehicle when the wheelchair is likely to move inside the vehicle cabin and occupant restraining performance of the seatbelt cannot be obtained can be made lower than the upper limit traveling speed of the vehicle when the wheelchair is less likely to move inside the vehicle cabin and the occupant restraining performance of the seatbelt can be obtained.

In the above aspect, the control unit may be configured to limit the upper limit traveling speed such that the upper limit traveling speed of the vehicle when the wheelchair is not fixed to the vehicle with the wheelchair fixing device and the occupant is wearing the seatbelt is lower than the upper limit traveling speed of the vehicle when the wheelchair is fixed to the vehicle with the wheelchair fixing device and the occupant is wearing the seatbelt.

In the above aspect, the control unit may be configured to limit the upper limit traveling speed such that the upper limit traveling speed of the vehicle when the wheelchair is fixed to the vehicle with the wheelchair fixing device and the occupant is not wearing the seatbelt is lower than the upper limit traveling speed of the vehicle when the wheelchair is fixed to the vehicle with the wheelchair fixing device and the occupant is wearing the seatbelt.

In the above aspect, the control unit may be configured to limit the upper limit traveling speed such that the upper limit traveling speed of the vehicle when there is the wheelchair in the vehicle cabin is equal to or lower than the upper limit traveling speed of the vehicle when there is no wheelchair in the vehicle cabin.

In the above aspect, the control unit may be configured to limit the upper limit acceleration such that the upper limit acceleration of the vehicle when the wheelchair is not fixed to the vehicle with the wheelchair fixing device and the occupant is not wearing the seatbelt is lower than the upper limit acceleration of the vehicle when the wheelchair is fixed to the vehicle with the wheelchair fixing device and the occupant is not wearing the seatbelt.

In the above aspect, the control unit may be configured to limit the upper limit acceleration such that the upper limit acceleration of the vehicle when the wheelchair is not fixed to the vehicle with the wheelchair fixing device and the occupant is not wearing the seatbelt is lower than the upper limit acceleration of the vehicle when the wheelchair is not fixed to the vehicle with the wheelchair fixing device and the occupant is wearing the seatbelt.

With the above configuration, the upper limit acceleration of the vehicle when the wheelchair is likely to move inside the vehicle cabin and occupant restraining performance of the seatbelt cannot be obtained can be made lower than the upper limit acceleration of the vehicle when the wheelchair is less likely to move inside the vehicle cabin and the occupant restraining performance of the seatbelt can be obtained.

In the above aspect, the control unit may be configured to limit the upper limit acceleration such that the upper limit acceleration of the vehicle when the wheelchair is not fixed to the vehicle with the wheelchair fixing device and the occupant is wearing the seatbelt is lower than the upper limit acceleration of the vehicle when the wheelchair is fixed to the vehicle with the wheelchair fixing device and the occupant is wearing the seatbelt.

In the above aspect, the control unit may be configured to limit the upper limit acceleration such that the upper limit acceleration of the vehicle when the wheelchair is fixed to the vehicle with the wheelchair fixing device and the occupant is not wearing the seatbelt is lower than the upper limit acceleration of the vehicle when the wheelchair is fixed to the vehicle with the wheelchair fixing device and the occupant is wearing the seatbelt.

In the above aspect, the control unit may be configured to limit the upper limit acceleration such that the upper limit acceleration of the vehicle when there is the wheelchair in the vehicle cabin is equal to or lower than the upper limit acceleration of the vehicle when there is no wheelchair in the vehicle cabin.

In the above aspect, the control unit may be configured to limit the upper limit acceleration such that the upper limit acceleration of the vehicle when the wheelchair is facing toward the rear of the vehicle is lower than the upper limit acceleration of the vehicle when the wheelchair is facing toward the front of the vehicle.

With the above configuration, the upper limit acceleration of the vehicle when the back of the occupant cannot be supported by the wheelchair at the time of acceleration of the vehicle (when the wheelchair is facing toward the rear of the vehicle) can be made lower than the upper limit acceleration of the vehicle when the back of the occupant can be supported by the wheelchair at the time of acceleration of the vehicle (when the wheelchair is facing toward the front of the vehicle).

In the above aspect, the control unit may be configured to limit the upper limit acceleration only when the wheelchair is facing toward the rear of the vehicle.

With the above configuration, it is possible to limit the upper limit acceleration of the vehicle when the back of the occupant cannot be supported by the wheelchair at the time of acceleration of the vehicle (when the wheelchair is facing toward the rear of the vehicle).

In the above aspect, the control unit may be configured to limit the upper limit acceleration when the wheelchair is not fixed to the vehicle with the wheelchair fixing device.

In the above aspect, the control unit may be configured to limit the upper limit acceleration when the occupant is not wearing the seatbelt.

With the above configuration, it is possible to limit the upper limit acceleration of the vehicle when the wheelchair is likely to move at the time of acceleration of the vehicle (when the wheelchair is not fixed to the vehicle).

In the above aspect, a display unit may be provided either or both of on an outer side of the vehicle or in the vehicle cabin, and the control unit may be configured to cause the display unit to display the fact that at least one of the upper limit traveling speed and the upper limit acceleration of the vehicle is limited when at least one of the upper limit traveling speed and the upper limit acceleration of the vehicle is limited.

With the above configuration, it is possible to inform people outside the vehicle (an occupant of the following vehicle, for example) and/or the occupant in the vehicle cabin of the fact that at least one of the upper limit traveling speed and the upper limit acceleration of the vehicle is limited.

In the above aspect, a hazard lamp may be provided on the outer side of the vehicle, and the control unit may be configured to cause the hazard lamp to flash when at least one of the upper limit traveling speed and the upper limit acceleration of the vehicle is limited.

With the above configuration, it is possible to inform, with the flash of the hazard lamp, people outside the vehicle (an occupant of the following vehicle, for example) of the fact that at least one of the upper limit traveling speed and the upper limit acceleration of the vehicle is limited.

In the above aspect, the vehicle may be configured to switch a driving mode between an autonomous driving mode and a manual driving mode, the autonomous driving mode being a mode in which the vehicle travels without driving operation by an occupant in a driver seat, the manual driving mode being a mode in which the vehicle travels with driving operation by the occupant in the driver seat. The control unit may be configured to limit at least one of the upper limit traveling speed and the upper limit acceleration of the vehicle depending on at least one of the conditions when the vehicle is traveling in the autonomous driving mode. The control unit may be configured to output the warning signal depending on at least one of the conditions without limiting the upper limit traveling speed and the upper limit acceleration of the vehicle when the vehicle is traveling in the manual driving mode.

With the above configuration, it is possible to limit at least one of the upper limit traveling speed and the upper limit acceleration of the vehicle when the occupant in the driver seat cannot prompt the occupant in the wheelchair to fix the wheelchair and/or wear the seatbelt (when the vehicle is traveling in the autonomous driving mode), etc. It is also possible to reduce unnecessary limitation on at least one of the upper limit traveling speed and the upper limit acceleration of the vehicle when the occupant in the driver seat can prompt the occupant in the wheelchair to fix the wheelchair and/or wear the seatbelt (when the vehicle is traveling in the manual driving mode), etc. In addition, when the vehicle is traveling in the manual driving mode and the wheelchair is not fixed or the occupant in the wheelchair is not wearing the seatbelt, the control unit outputs the warning signal, so that the occupant in the driver seat and other occupants in the vehicle cabin can be informed of the fact that the wheelchair is not fixed or the occupant in the wheelchair is not wearing the seatbelt.

In the above aspect, the vehicle may be configured to switch a driving mode between an autonomous driving mode and a manual driving mode, the autonomous driving mode being a mode in which the vehicle travels without driving operation by an occupant in a driver seat, the manual driving mode being a mode in which the vehicle travels with driving operation by the occupant in the driver seat. The control unit may be configured to output the warning signal depending on at least one of the conditions without limiting the upper limit traveling speed and the upper limit acceleration of the vehicle when the vehicle is traveling in the autonomous driving mode and there is a cabin crew in the vehicle cabin.

With the above configuration, it is possible to reduce unnecessary limitation on at least one of the upper limit traveling speed and the upper limit acceleration of the vehicle, when the occupant in the driver seat cannot prompt the occupant in the wheelchair to fix the wheelchair and/or wear the seatbelt (the vehicle is traveling in the autonomous driving mode) but the cabin crew can prompt the occupant in the wheelchair to fix the wheelchair and/or wear the seatbelt etc. Also, when the vehicle is traveling in the autonomous driving mode and the wheelchair is not fixed and the occupant in the wheelchair is not wearing the seatbelt, the control unit outputs the warning signal, so that the cabin crew can be informed of the fact that the wheelchair is not fixed or the occupant in the wheelchair is not wearing the seatbelt.

In the above aspect, the vehicle may be an autonomous driving vehicle configured to travel autonomously without driving operation by an occupant in the vehicle cabin.

With the above configuration, it is possible to control the vehicle and/or issue a warning in consideration of the wheelchair in the vehicle cabin, even for the vehicle in which there is no occupant to drive the vehicle.

According to the aspect of the disclosure, it is possible to control a vehicle and issue a warning in consideration of a wheelchair in a vehicle cabin.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a table showing vehicle control and determination conditions for the vehicle interlock system;

DETAILED DESCRIPTION OF EMBODIMENTS

First Embodiment

Figure 1:
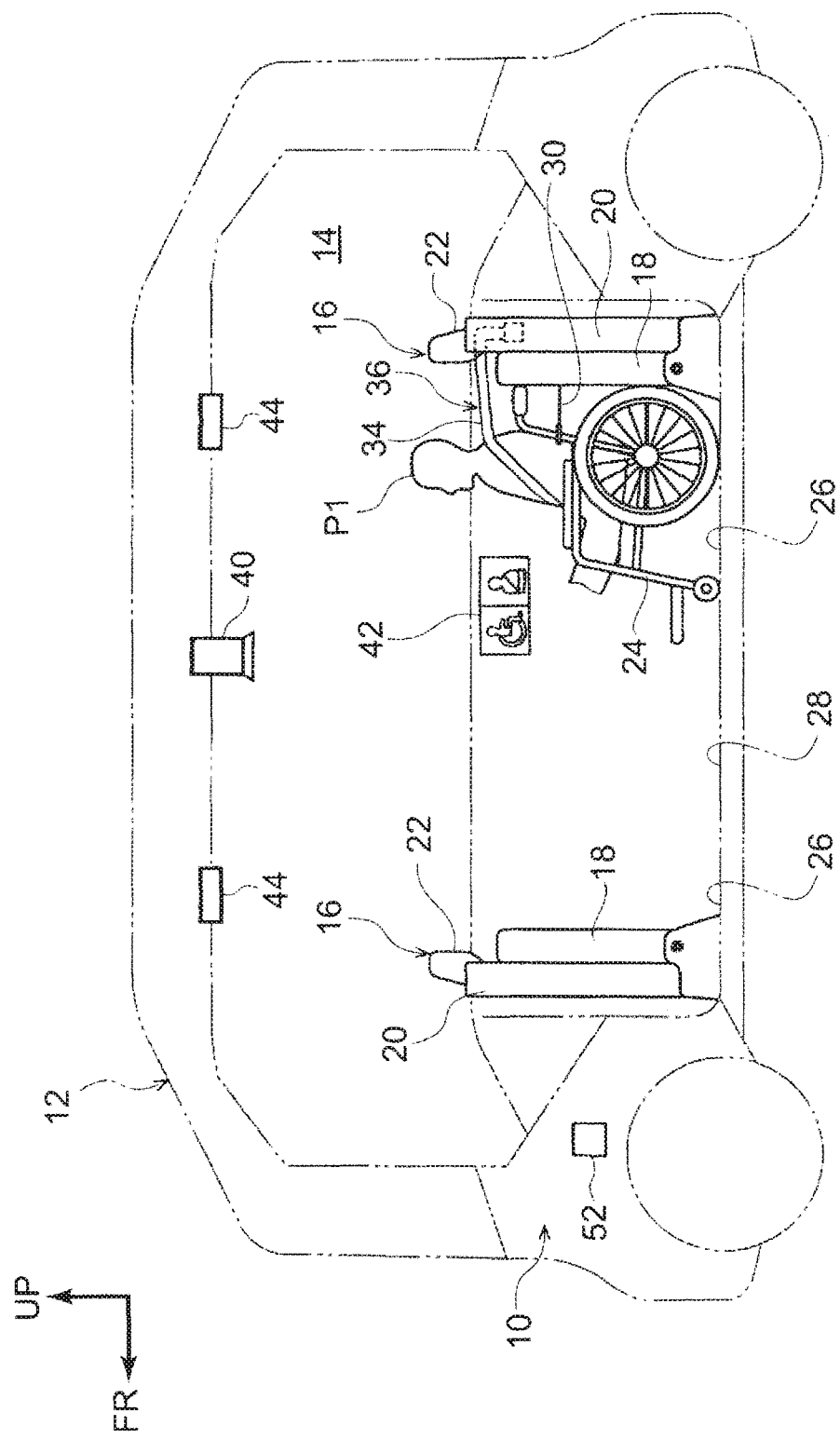
FIG. 1 is a side view of a vehicle cabin of a vehicle including a vehicle interlock system as seen in a vehicle width direction, showing a case in which there is a wheelchair facing toward a front of a vehicle in the vehicle cabin.

A vehicle interlock system 10 according to a first embodiment of the disclosure will be described with reference to FIGS. 1 to 5. In the following description, front-rear, right-left, and up-down directions respectively indicate front-rear, right-left, up-down directions of a vehicle. Arrows FR, UP, RH, LH that are appropriately shown in the drawings indicate forward, upward, right and left directions, respectively.

As shown in FIG. 1, a vehicle 12 to which the vehicle interlock system 10 according to the embodiment is applied is an autonomous driving vehicle that can autonomously travels without driving operation. A pair of vehicle seats 16 is provided in a vehicle cabin 14 of the vehicle 12. The vehicle seats 16 face each other in a vehicle front-rear direction. Each vehicle seat 16 includes a seat cushion 18, a seat back 20, and a headrest 22 that support the buttocks, back, and head of a seated occupant, respectively. Here, the seat cushion 18 is connected to a lower end of the seat back 20 such that the seat cushion 18 can be tilted around an axis extending in a vehicle width direction. By tilting upward (flipping up) each seat cushion 18 from a position where the occupant can sit down, it is possible to secure a pair of wheelchair mounting spaces 26 for mounting a wheelchair 24 (space on a floor 28 of the vehicle cabin 14) described later. FIG. 1 shows the seat cushions 18 of the vehicle seats 16 in a flipped-up state.

In the vehicle cabin 14 of the vehicle 12, a wheelchair fixing device 30 is provided for fixing the wheelchair 24 mounted on the wheelchair mounting space 26 to the vehicle 12. Although detailed description of a configuration of the wheelchair fixing device 30 is omitted, the wheelchair fixing device 30 only needs to have a configuration that can fix the wheelchair 24 to the floor 28, the vehicle seat 16 or the like, to restrain movement of the wheelchair 24 in the vehicle front-rear and right-left directions. The wheelchair fixing device 30 includes a wheelchair fixing detection switch 32 (see FIG. 3) for detecting that the wheelchair 24 is fixed to the vehicle 12 with the wheelchair fixing device 30. The wheelchair fixing detection switch 32 is, for example, a latch detection switch, and is electrically (directly or indirectly) connected to an electronic control unit (ECU) 52 described later.

A seatbelt device 36 having a seatbelt 34 that an occupant P1 seated in the wheelchair 24 wears is provided in the vehicle cabin 14 of the vehicle 12. Although detailed description of a configuration of the seatbelt device 36 is omitted here, the seatbelt device 36 may be a so-called two-point seatbelt device, a three-point seatbelt device, or may be a seatbelt device with four or more points. FIG. 1 shows the occupant P1 seated in the wheelchair 24 and wearing the seatbelt 34 of the three-point seatbelt device 36. The seatbelt device 36 includes a seatbelt wearing detection switch 38 (see FIG. 3) for detecting that the occupant P1 seated in the wheelchair 24 is wearing the seatbelt 34. The seatbelt wearing detection switch 38 is, for example, a buckle switch, and is electrically (directly or indirectly) connected to the ECU 52 described later.

In the vehicle cabin 14 of the vehicle 12, a camera 40 is provided for detecting whether there is the wheelchair 24 in the vehicle cabin 14, whether the wheelchair 24 is facing toward a front of the vehicle 12 or a rear of the vehicle 12, and the like. Based on a signal from the camera 40, the presence or absence of the wheelchair 24, the direction in which the wheelchair 24 faces, and the like are detected. The camera 40 is electrically (directly or indirectly) connected to the ECU 52 described later. The camera 40 may detect the movement of the wheelchair 24 to determine whether the wheelchair 24 is fixed to the vehicle 12 with the wheelchair fixing device 30.

A warning lamp 42 serving as a display unit is provided near the wheelchair mounting space 26 in the vehicle cabin 14 of the vehicle 12. The lit warning lamp 42 can prompt the occupant P1 in the vehicle cabin 14 to fix the wheelchair 24 and wear the seatbelt 34. The warning lamp 42 is electrically (directly or indirectly) connected to the ECU 52 described later.

A buzzer 44 is provided in the vehicle cabin 14 of the vehicle 12. A sound of the buzzer 44 can prompt the occupant P1 in the vehicle cabin 14 to fix the wheelchair 24 and wear the seatbelt 34. The buzzer 44 is electrically (directly or indirectly) connected to the ECU 52 described later.

Figure 2:
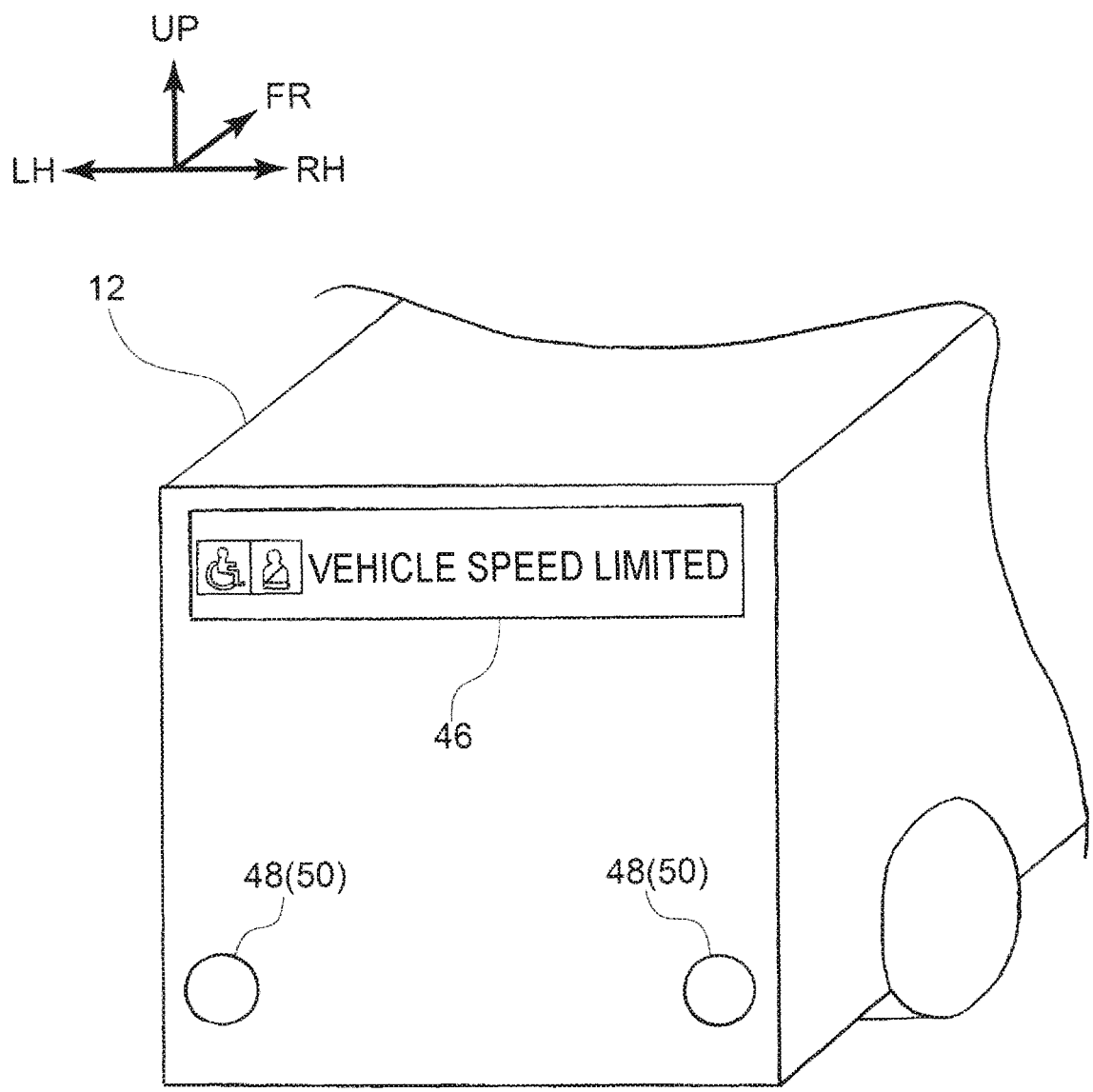
FIG. 2 is a perspective view of the vehicle including the vehicle interlock system as seen obliquely from a vehicle rear side.

As shown in FIG. 2, a display 46 serving as the display unit is provided in an upper rear part of the vehicle 12. Through the display 46, information on the vehicle 12 can be transmitted to people outside the vehicle 12 (for example, an occupant of a following vehicle). The display 46 is electrically (directly or indirectly) connected to the ECU 52 described later. A pair of right and left hazard lamps 48 is provided in a lower rear part of the vehicle 12. The hazard lamps 48 are also used as turn signal lamps 50.

As shown in FIGS. 1 and 2, the vehicle interlock system 10 of the present embodiment is configured to include, as a main component, the ECU 52 serving as a control unit that controls the wheelchair fixing device 30, the seatbelt device 36, the warning lamp 42, the display 46, the vehicle 12, and the like.

Figure 3:
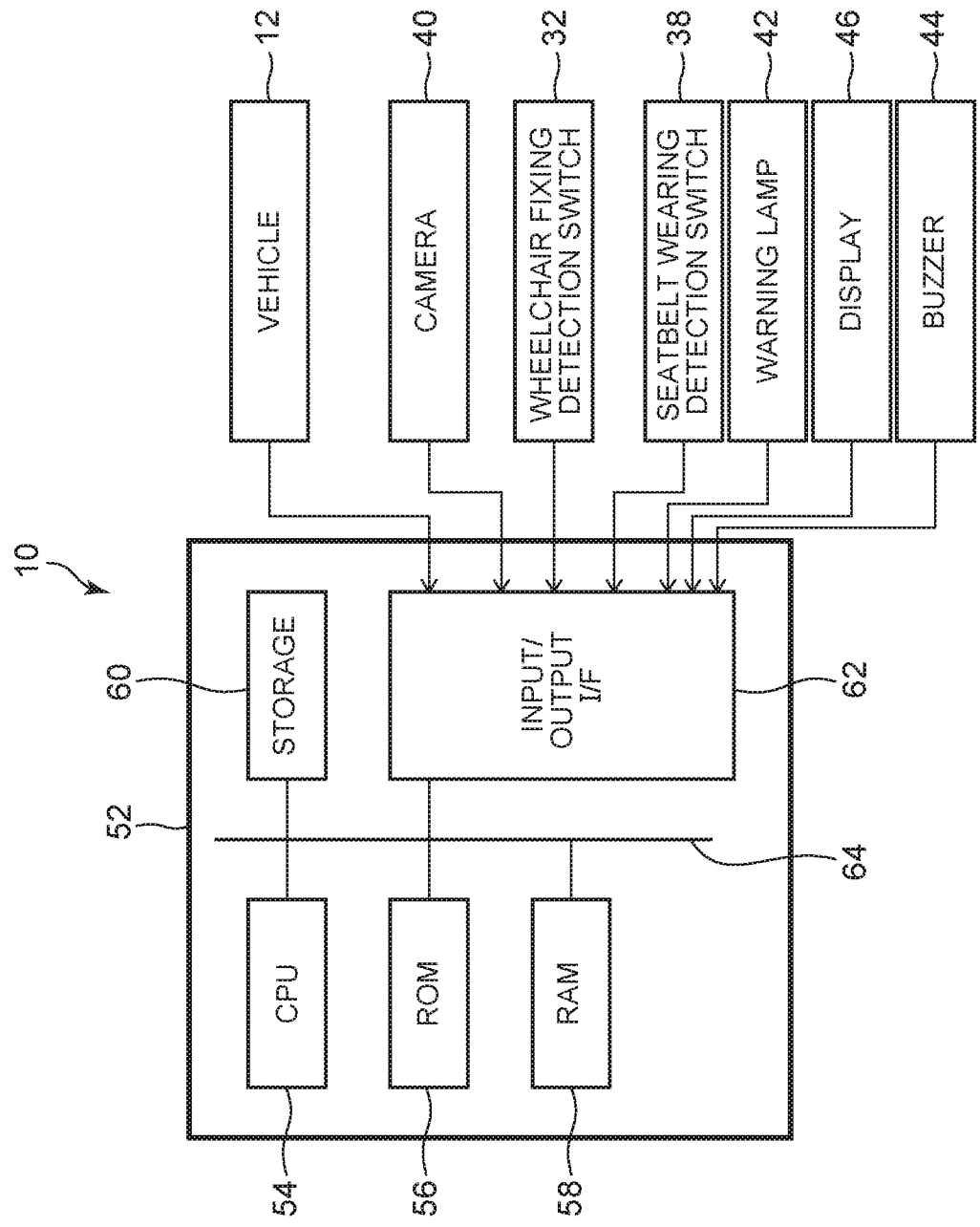
FIG. 3 is a block diagram showing a control unit etc. of the vehicle interlock system.

As shown in FIG. 3, the ECU 52 includes a central processing unit (CPU) 54, a read only memory (ROM) 56, a random access memory (RAM) 58, a storage 60, and an input/output interface (I/F) 62 for communicating with external devices. The CPU 54, the ROM 56, the RAM 58, the storage 60, and the input/output interface 62 are connected to each other via a bus 64 so as to be able to communicate with each other. The input/output interface 62 is electrically connected to the wheelchair fixing detection switch 32, the seatbelt wearing detection switch 38, the camera 40, the warning lamp 42, the buzzer 44, the display 46, a power unit (for example, a motor) of the vehicle 12, and the like. The CPU 54 is a central processing unit that executes various programs and controls the power unit and the like. That is, the CPU 54 reads a control program from the ROM 56 or the storage 60 based on signals from the wheelchair fixing detection switch 32, the seatbelt wearing detection switch 38, and the like, and executes the control program using the RAM 58 as a work area to control the power unit and the like.

As shown in FIG. 4, the ECU 52 limits an upper limit traveling speed and an upper limit acceleration of the vehicle 12 and outputs a warning signal described in detail later, depending on whether there is the wheelchair 24 in the vehicle cabin 14, whether the wheelchair 24 is fixed to the vehicle 12 with the wheelchair fixing device 30, and whether the occupant P1 seated in the wheelchair 24 is wearing the seatbelt 34.

Control of Vehicle 12

Figure 5:
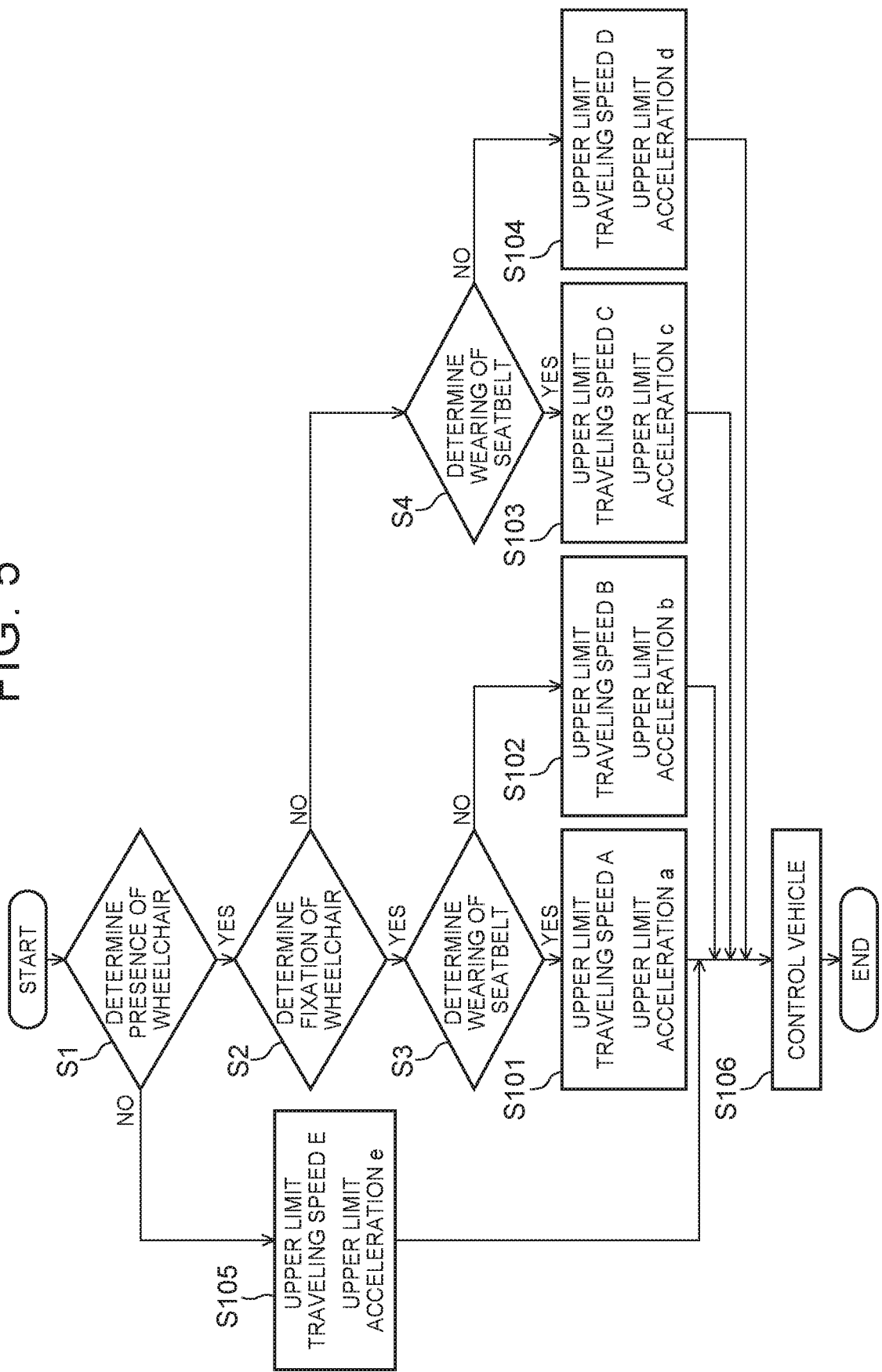
FIG. 5 is a flowchart illustrating the vehicle control by the vehicle interlock system.

As shown in FIGS. 1, 3 and 5, the ECU 52 determines whether there is the wheelchair 24 in the vehicle cabin 14 based on a video signal from the camera 40 (step S1).

When a negative determination is made in step S1, that is, when it is determined that there is no wheelchair 24 in the vehicle cabin 14, the ECU 52 determines the upper limit traveling speed of the vehicle 12 to be E and the upper limit acceleration of the vehicle 12 to be e (step S105). The ECU 52 then controls the vehicle 12 so that the upper limit traveling speed and the upper limit acceleration of the vehicle 12 do not exceed these thresholds (step S106). Note that the thresholds E and e are not limited, for example. When the thresholds E and e are not limited, the upper limit traveling speed and the upper limit acceleration of the vehicle 12 are not limited.

On the other hand, when an affirmative determination is made in step S1, that is, when it is determined that there is the wheelchair 24 in the vehicle cabin 14, the ECU 52 determines whether the wheelchair 24 is fixed to the vehicle 12 with the wheelchair fixing device 30 based on the signal from the wheelchair fixing detection switch 32 (step S2).

When an affirmative determination is made in step S2, that is, when it is determined that the wheelchair 24 is fixed to the vehicle 12 with the wheelchair fixing device 30, the ECU 52 determines whether the occupant P1 seated in the wheelchair 24 is wearing the seatbelt 34 based on the signal from the seatbelt wearing detection switch 38 (step S3).

When an affirmative determination is made in step S3, that is, when it is determined that the occupant P1 seated in the wheelchair 24 is wearing the seatbelt 34, the ECU 52 determines the upper limit traveling speed of the vehicle 12 to be A and the upper limit acceleration of the vehicle 12 to be a (step S101). The ECU 52 then controls the vehicle 12 so that the upper limit traveling speed and the upper limit acceleration of the vehicle 12 do not exceed these thresholds (step S106). The thresholds A and a are set to be non-limited and 0.3 G, respectively, for example.

On the other hand, when a negative determination is made in step S3, that is, when it is determined that the occupant P1 seated in the wheelchair 24 is not wearing the seatbelt 34, the ECU 52 determines the upper limit traveling speed of the vehicle 12 to be B and the upper limit acceleration of the vehicle 12 to be b (step S102). The ECU 52 then controls the vehicle 12 so that the upper limit traveling speed and the upper limit acceleration of the vehicle 12 do not exceed these thresholds (step S106). The thresholds B and b are set to 30 km/h and 0.1 G, respectively, for example.

On the other hand, when a negative determination is made in step S2, that is, when it is determined that the wheelchair 24 is not fixed to the vehicle 12 with the wheelchair fixing device 30, the ECU 52 determines whether the occupant P1 seated in the wheelchair 24 is wearing the seatbelt 34 (step S4).

When an affirmative determination is made in step S4, that is, when it is determined that the occupant P1 seated in the wheelchair 24 is wearing the seatbelt 34, the ECU 52 determines the upper limit traveling speed of the vehicle 12 to be C and the upper limit acceleration of the vehicle 12 to be c (step S103). The ECU 52 then controls the vehicle 12 so that the upper limit traveling speed and the upper limit acceleration of the vehicle 12 do not exceed these thresholds (step S106). The thresholds C and c are set to 20 km/h and 0.3 G, respectively, for example.

On the other hand, when a negative determination is made in step S4, that is, when it is determined that the occupant P1 seated in the wheelchair 24 is not wearing the seatbelt 34, the ECU 52 determines the upper limit traveling speed of the vehicle 12 to be D and the upper limit acceleration of the vehicle 12 to be d (step S104). The ECU 52 then controls the vehicle 12 so that the upper limit traveling speed and the upper limit acceleration of the vehicle 12 do not exceed these thresholds (step S106). The thresholds D and d are set to 0 km/h and 0 G, for example.

Figure 6:
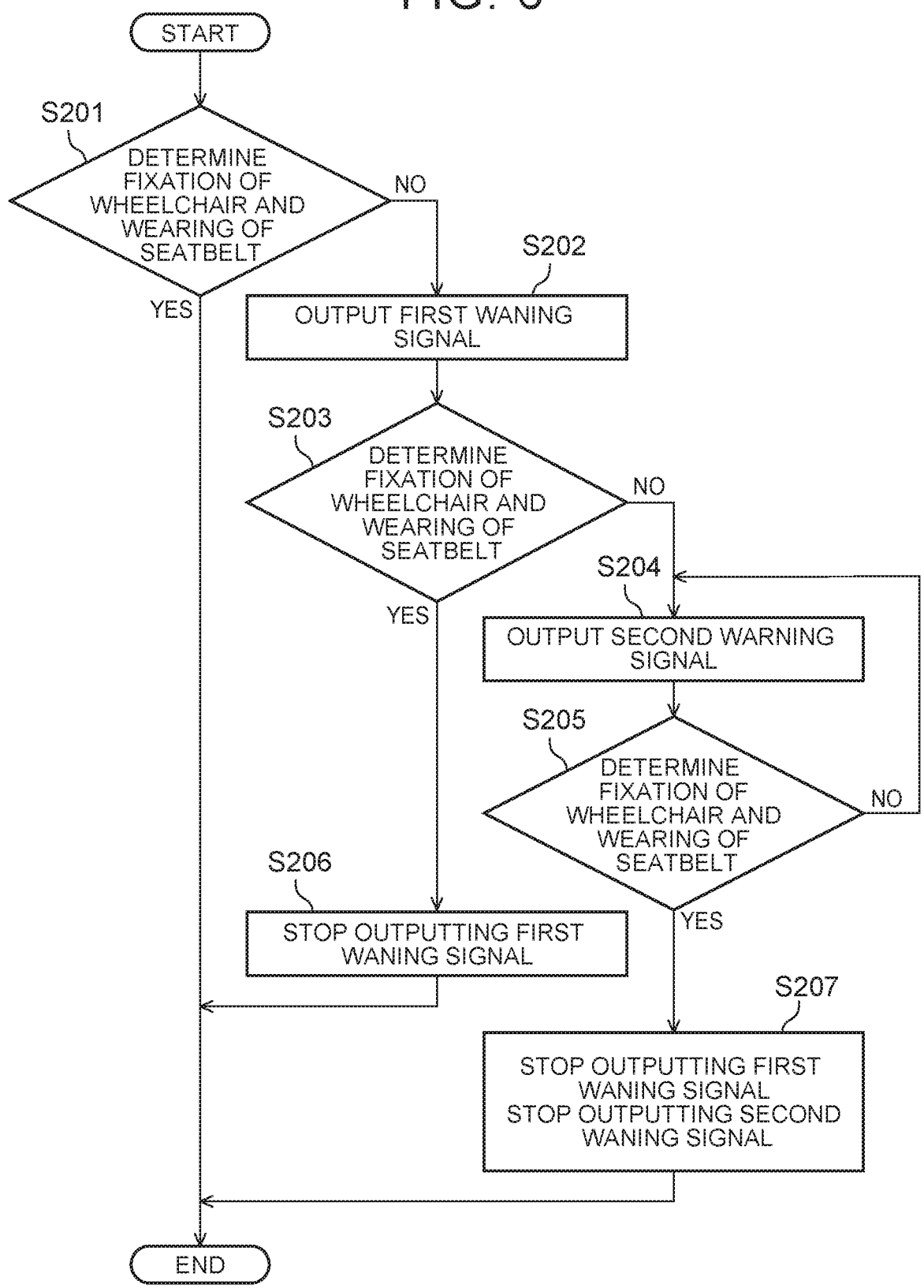
FIG. 6 is a flowchart illustrating lighting of a warning lamp and activation of a buzzer based on an output of a warning signal by the vehicle interlock system.
Figure 7:
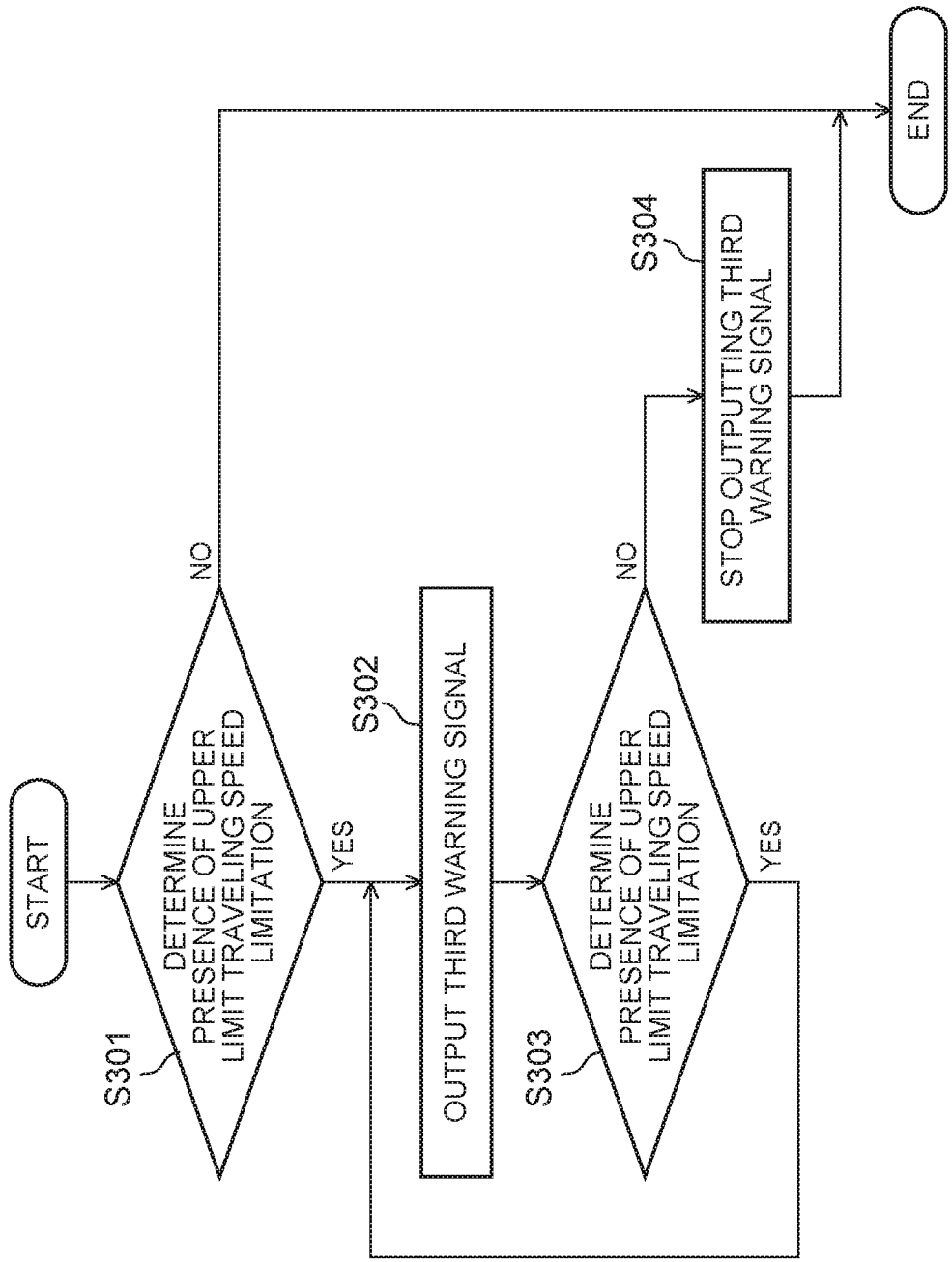
FIG. 7 is a flowchart illustrating an indication on a display based on the output of the warning signal by the vehicle interlock system.

Lighting of Warning Lamp and Activation of Buzzer Based on Output of Warning Signal As shown in FIGS. 1, 3 and 6, the ECU 52 determines whether the wheelchair 24 is fixed to the vehicle 12 with the wheelchair fixing device 30 and the occupant P1 seated in the wheelchair 24 is wearing the seatbelt 34 based on the signals from the wheelchair fixing detection switch 32 and the seatbelt wearing detection switch 38 (step S201).

When an affirmative determination is made in step S201 (when it is determined that the wheelchair 24 is fixed to the vehicle 12 with the wheelchair fixing device 30 and the occupant P1 seated in the wheelchair 24 is wearing the seatbelt 34), the ECU 52 ends the process.

When a negative determination is made in step S201 (when it is determined that the wheelchair 24 is not fixed to the vehicle 12 with the wheelchair fixing device 30, or the occupant P1 seated in the wheelchair 24 is not wearing the seatbelt 34, or the wheelchair 24 is not fixed to the vehicle 12 with the wheelchair fixing device 30 as well as the occupant P1 seated in the wheelchair 24 is not wearing the seatbelt 34), the ECU 52 outputs a first warning signal (step S202). Thereby, the warning lamp 42 of the vehicle 12 lights up, and the occupant P1 is prompted to fix the wheelchair 24 and/or wear the seatbelt 34.

After passage of a predetermined time following the output of the first warning signal in step S202, the ECU 52 again determines whether the wheelchair 24 is fixed to the vehicle 12 with the wheelchair fixing device 30 and the occupant P1 seated in the wheelchair 24 is wearing the seatbelt 34 (step S203).

When an affirmative determination is made in step S203, that is, when it is determined that the wheelchair 24 is fixed to the vehicle 12 with the wheelchair fixing device 30 and the occupant P1 seated in the wheelchair 24 is wearing the seatbelt 34, the ECU 52 stops outputting the first warning signal (step S206), and ends the process.

When a negative determination is made in step S203, that is, when the wheelchair 24 is not fixed to the vehicle 12 with the wheelchair fixing device 30, or the occupant P1 seated in the wheelchair 24 is not wearing the seatbelt 34, or the wheelchair 24 is not to fixed to the vehicle 12 with the wheelchair fixing device 30 as well as the occupant P1 seated in the wheelchair 24 is not wearing the seatbelt 34, the ECU 52 outputs a second warning signal (step S204). Thereby, the buzzer 44 of the vehicle 12 sounds, and the occupant P1 is prompted to fix the wheelchair 24 and/or wear the seatbelt 34.

After passage of a predetermined time following the output of the second warning signal in step S204, the ECU 52 again determines whether the wheelchair 24 is fixed to the vehicle 12 with the wheelchair fixing device 30 and the occupant P1 seated in the wheelchair 24 is wearing the seatbelt 34 (step S205).

When an affirmative determination is made in step S205, that is, when it is determined that the wheelchair 24 is fixed to the vehicle 12 with the wheelchair fixing device 30 and the occupant P1 seated in the wheelchair 24 is wearing the seatbelt 34, the ECU 52 stops outputting the first and second warning signals (step S207), and ends the process.

When a negative determination is made in step S205, that is, when the wheelchair 24 is not fixed to the vehicle 12 with the wheelchair fixing device 30, or the occupant P1 seated in the wheelchair 24 is not wearing the seatbelt 34, or the wheelchair 24 is not to fixed to the vehicle 12 with the wheelchair fixing device 30 as well as the occupant P1 seated in the wheelchair 24 is not wearing the seatbelt 34, the ECU 52 continues to output the second warning signal (step S204). Thereby, the buzzer 44 of the vehicle 12 sounds, and the occupant P1 is prompted to fix the wheelchair 24 and/or wear the seatbelt 34.

Indication on Display Based on Output of Warning Signal

As shown in FIGS. 1, 2, 3, and 7, the ECU 52 determines whether the upper limit traveling speed of the vehicle 12 is limited based on a process flow shown in FIG. 5 (step S301).

When a negative determination is made in step S301, that is, when it is determined that the upper limit traveling speed of the vehicle 12 is not limited, the ECU 52 ends the process.

On the other hand, when an affirmative determination is made in step S301, that is, when it is determined that the upper limit traveling speed of the vehicle 12 is limited, the ECU 52 outputs a third warning signal (step S302). Thereby, an indication "the vehicle speed is limited" is displayed on the display 46 of the vehicle 12, so that people outside the vehicle 12 such as an occupant of the following vehicle are informed of the fact that the vehicle 12 cannot travel at a speed exceeding a predetermined speed. Here, the hazard lamps 48 may be configured to flash based on the output of the third warning signal. Further, an indication "the vehicle acceleration is limited" may be displayed.

After passage of a predetermined time following the output of the third warning signal in step S302, the ECU 52 again determines whether the upper limit traveling speed of the vehicle 12 is limited (step S303).

When an affirmative determination is made in step S303, that is, when it is determined that the upper limit traveling speed of the vehicle 12 is limited, the ECU 52 continues to output the third warning signal (step S302). Thereby, the indication "the vehicle speed is limited" is continued to be displayed on the display 46 of the vehicle 12, so that people outside the vehicle 12 such as an occupant of the following vehicle are continued to be informed of the fact that the vehicle 12 cannot travel at a speed exceeding the predetermined speed.

When a negative determination is made in step S303 (when it is determined that the upper limit traveling speed of the vehicle 12 is not limited), the ECU 52 stops outputting the third warning signal (step S304), and ends the process.

As described above, with the vehicle interlock system 10 according to the present embodiment, it is possible to control the vehicle 12 and issue a warning in consideration of the wheelchair 24 in the vehicle cabin 14.

In the present embodiment, an example has been described in which the thresholds A, B, C, D, and E of the upper limit traveling speed are set to be non-limited, 30 km/h, 20 km/h, 0 km/h, and non-limited, respectively, and the thresholds a, b, c, d, and e of the upper limit acceleration are set to 0.3 G, 0.1 G, 0.1 G, 0 G, and non-limited, respectively, as shown in FIG. 4. However, the disclosure is not limited to this. The thresholds may be appropriately set in consideration of the conditions of the road on which the vehicle travels, etc. Further, the vehicle 12 may be controlled in consideration of a deceleration at the time of deceleration of the vehicle 12 as the threshold of the upper limit acceleration.

Figure 8:
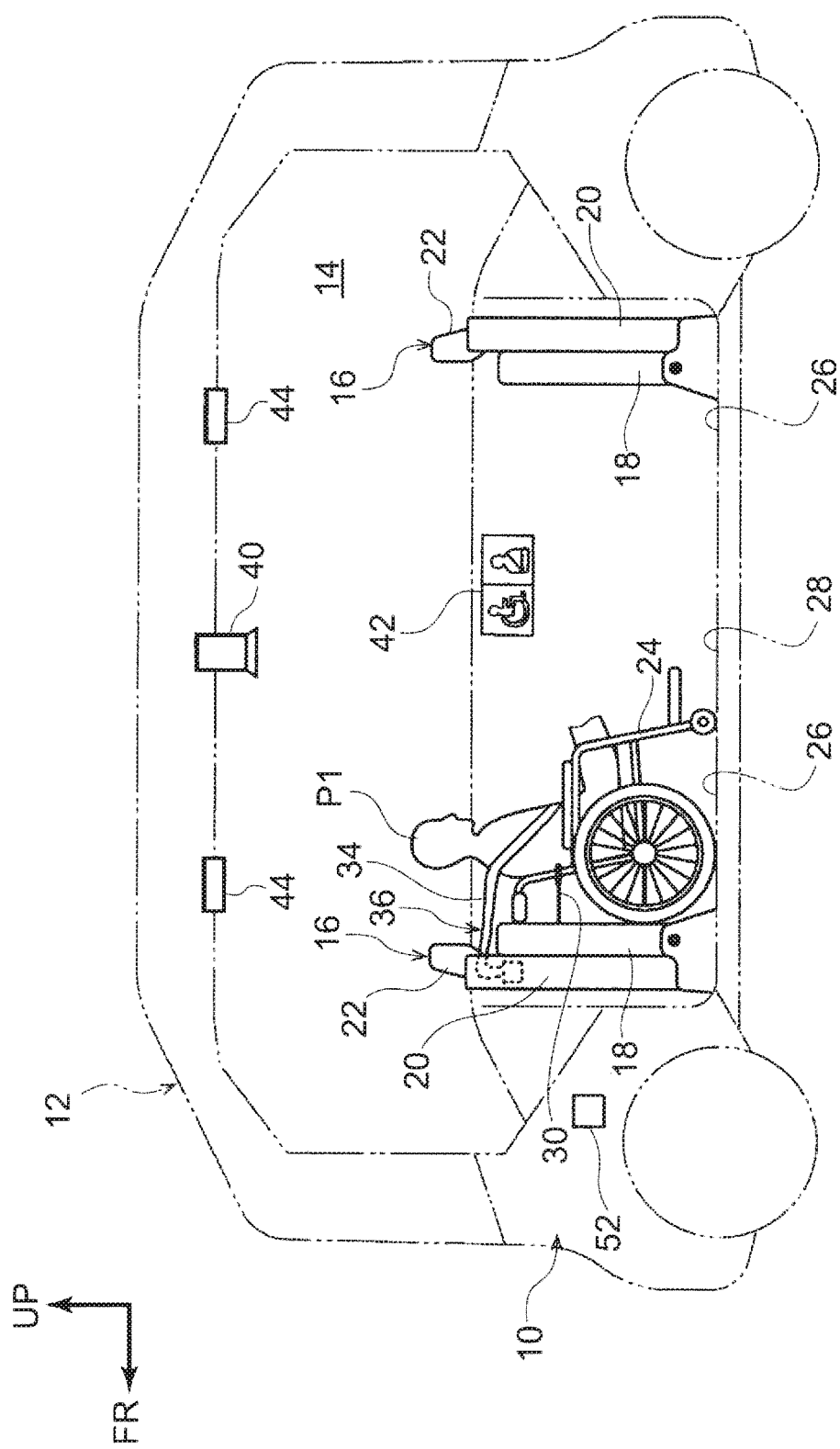
FIG. 8 is a side view, corresponding to FIG. 1 of the vehicle cabin of the vehicle including the vehicle interlock system as seen in the vehicle width direction, showing a case in which there is a wheelchair facing toward a rear of the vehicle in the vehicle cabin.
Figure 9:
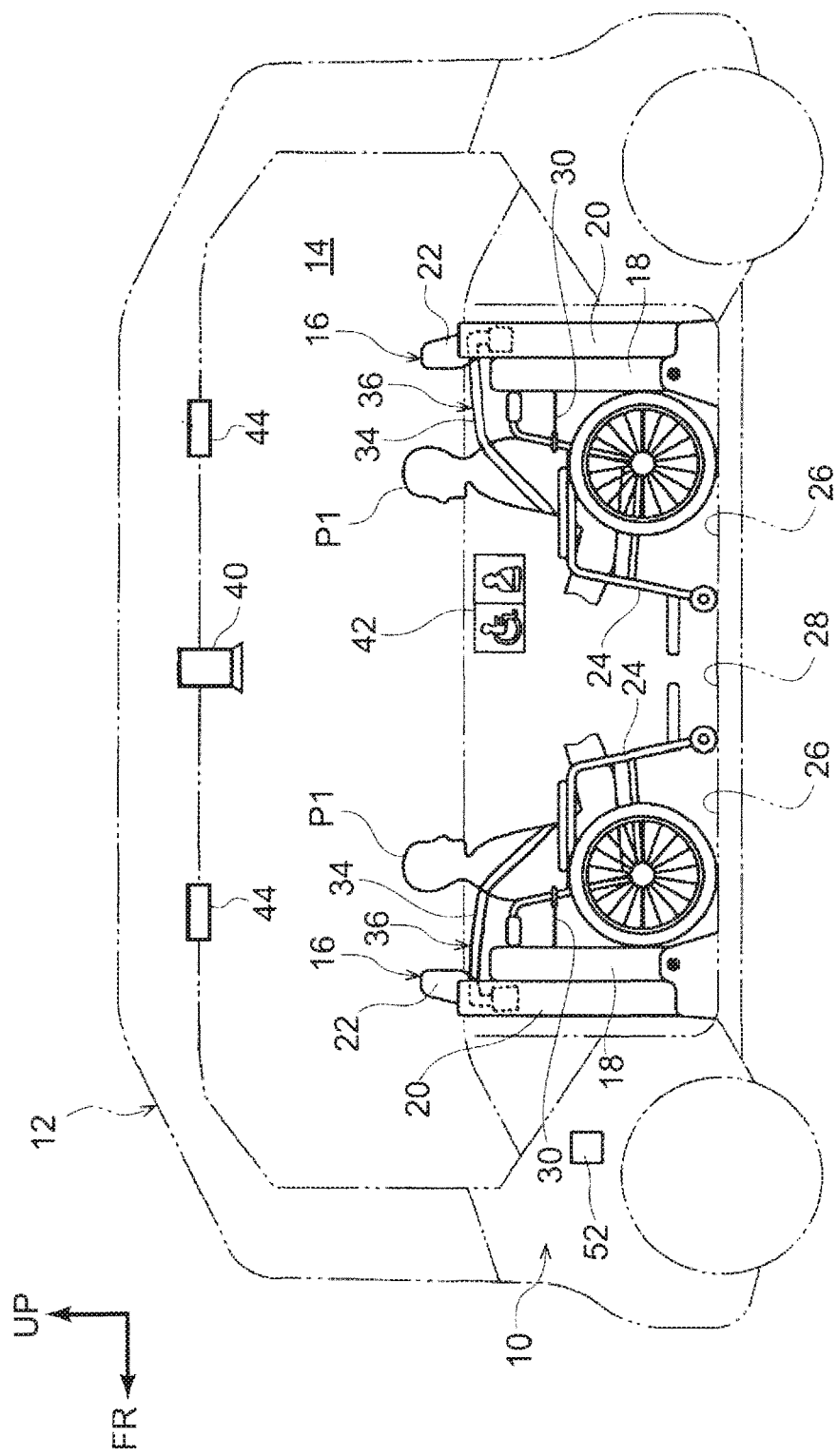
FIG. 9 is a side view, corresponding to FIG. 1, of the vehicle cabin of the vehicle including the vehicle interlock system as seen in the vehicle width direction, showing a case in which there is the wheelchair facing toward the rear of the vehicle and the wheelchair facing toward the front of the vehicle in the vehicle cabin.

The thresholds A, B, C, D, and E of the upper limit traveling speed may be set in the following ranges (1), (2), (3), (4), and (5).
 (1) E≥A>B>D
 (2) E≥A>C>D
 (3) E>A>B>C>D
 (4) E>A>C>B>D
 (5) E>A>B=C>D The thresholds a, b, c, d, and e of the upper limit acceleration may be set in the following ranges (6), (7), (8), (9), and (10).
 (6) e≥a>b>d
 (7) e≥a>c>d
 (8) e>a>b>c>d
 (9) e>a>c>b>d
 (10) e>a>b=c>d Vehicle Control Considering Wheelchair Orientation As shown in FIGS. 8 and 9, when there is the wheelchair 24 facing toward the rear of the vehicle 12 in the vehicle cabin 14, an occupant in the wheelchair 24 facing toward the rear of the vehicle 12 is not supported at his/her back by a backrest of the wheelchair 24 at the time of acceleration of the vehicle 12. In some embodiments, the upper limit acceleration is may be set lower when there is the wheelchair 24 facing toward the rear of the vehicle 12 than when there is no wheelchair 24 facing toward the rear of the vehicle 12. Hereinafter, control of the vehicle 12 in consideration of that point will be described. Note that, in the following, the description of steps that are the same as those in the control described with reference to FIG. 5 may be omitted.

Figure 10:
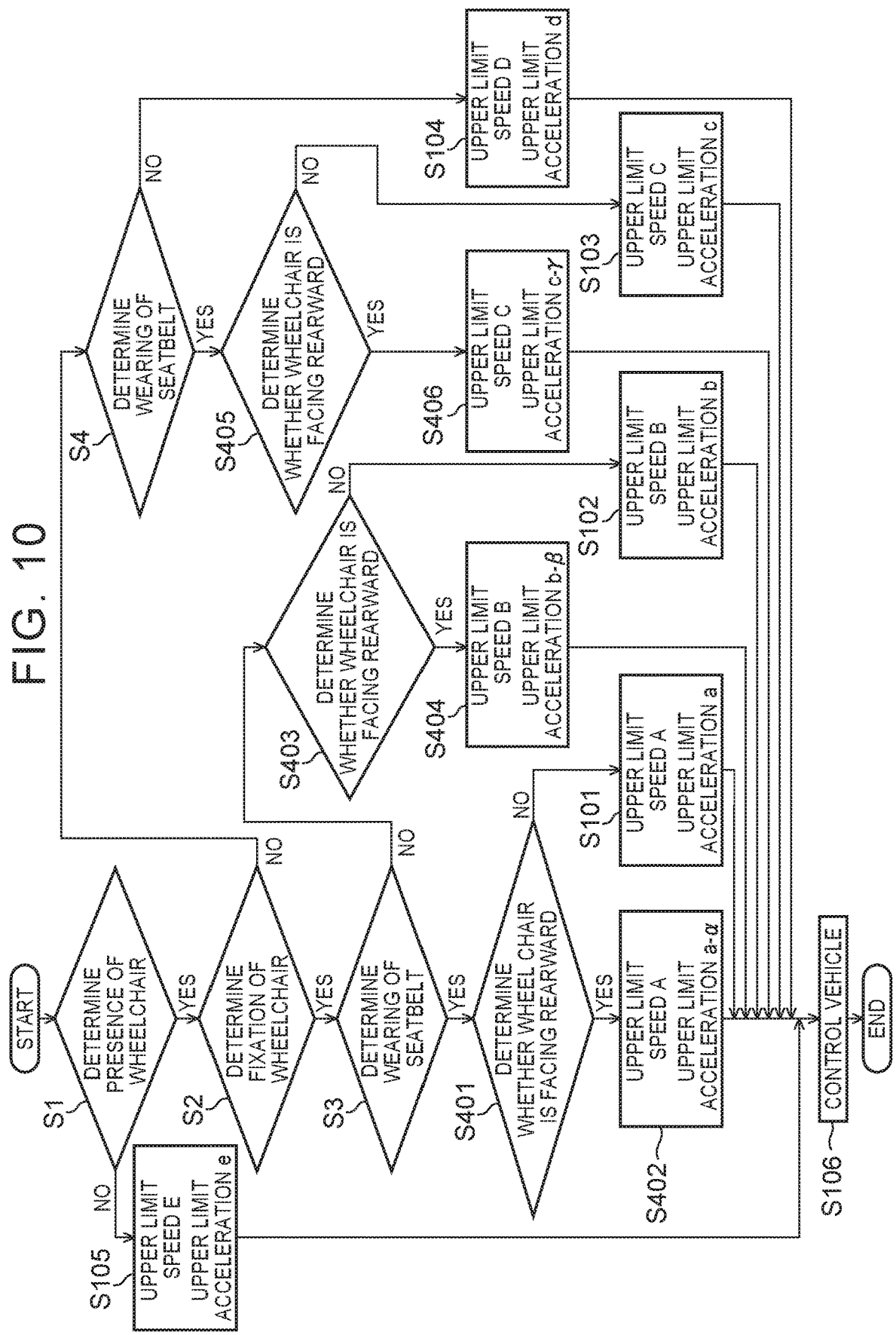
FIG. 10 is a flowchart, corresponding to FIG. 5, illustrating the vehicle control by the vehicle interlock system in consideration of presence or absence of the wheelchair facing toward the rear of the vehicle.

As shown in FIG. 10, when an affirmative determination is made in step S3, the ECU 52 determines whether there is the wheelchair 24 facing toward the rear of the vehicle 12 in the vehicle cabin 14, based on the video signal from the camera 40 (step S401).

When a negative determination is made in step S401, that is, when it is determined that there is no wheelchair 24 facing toward the rear of the vehicle 12 in the vehicle cabin 14, the ECU 52 determines the upper limit traveling speed of the vehicle 12 to be A and the upper limit acceleration of the vehicle 12 to be a (step S101). The ECU 52 then controls the vehicle 12 so that the upper limit traveling speed and the upper limit acceleration of the vehicle 12 do not exceed these thresholds (step S106). The thresholds A and a are set to be non-limited and 0.3 G, respectively, for example.

On the other hand, when an affirmative determination is made in step S401, that is, when it is determined that there is the wheelchair 24 facing toward the rear of the vehicle 12 in the vehicle cabin 14, the ECU 52 determines the upper limit traveling speed of the vehicle 12 to be A and the upper limit acceleration of the vehicle 12 to be a-α (step S402). The ECU 52 then controls the vehicle 12 so that the upper limit traveling speed and the upper limit acceleration of the vehicle 12 do not exceed these thresholds (step S106). The thresholds A and a-α are set to be non-limited and 0.2 G, respectively, for example.

When a negative determination is made in step S3, the ECU 52 determines whether there is the wheelchair 24 facing toward the rear of the vehicle 12 in the vehicle cabin 14, based on the video signal from the camera 40 (step S403).

When a negative determination is made in step S403, that is, when it is determined that there is no wheelchair 24 facing toward the rear of the vehicle 12 in the vehicle cabin 14, the ECU 52 determines the upper limit traveling speed of the vehicle 12 to be B and the upper limit acceleration of the vehicle 12 to be b (step S102). The ECU 52 then controls the vehicle 12 so that the upper limit traveling speed and the upper limit acceleration of the vehicle 12 do not exceed these thresholds (step S106). The thresholds B and b are set to 30 km/h and 0.1 G, respectively, for example.

On the other hand, when an affirmative determination is made in step S403, that is, when it is determined that there is the wheelchair 24 facing toward the rear of the vehicle 12 in the vehicle cabin 14, the ECU 52 determines the upper limit traveling speed of the vehicle 12 to be B and the upper limit acceleration of the vehicle 12 to be b-β (step S404). The ECU 52 then controls the vehicle 12 so that the upper limit traveling speed and the upper limit acceleration of the vehicle 12 do not exceed these thresholds (step S106). The thresholds B and b-β are set to 30 km/h and 0.08 G, respectively, for example.

When a negative determination is made in step S4, the ECU 52 determines whether there is the wheelchair 24 facing toward the rear of the vehicle 12 in the vehicle cabin 14, based on the video signal from the camera 40 (step S405).

When a negative determination is made in step S405, that is, when it is determined that there is no wheelchair 24 facing toward the rear of the vehicle 12 in the vehicle cabin 14, the ECU 52 determines the upper limit traveling speed of the vehicle 12 to be C and the upper limit acceleration of the vehicle 12 to be c (step S103). The ECU 52 then controls the vehicle 12 so that the upper limit traveling speed and the upper limit acceleration of the vehicle 12 do not exceed these thresholds (step S106). The thresholds C and c are set to 20 km/h and 0.1 G, respectively, for example.

On the other hand, when an affirmative determination is made in step S405, that is, when it is determined that there is the wheelchair 24 facing toward the rear of the vehicle 12 in the vehicle cabin 14, the ECU 52 determines the upper limit traveling speed of the vehicle 12 to be C and the upper limit acceleration of the vehicle 12 to be c-γ (step S406). The ECU 52 then controls the vehicle 12 so that the upper limit traveling speed and the upper limit acceleration of the vehicle 12 do not exceed these thresholds (step S106). The thresholds C and c-γ are set to 20 km/h and 0.08 G, respectively, for example.

By controlling the vehicle 12 as described above, it is possible to restrain the occupant P1 in the wheelchair 24 facing toward the rear of the vehicle 12 from losing his/her balance at the time of acceleration of the vehicle 12. Note that the upper limit acceleration may be limited only when it is determined that there is the wheelchair 24 facing toward the rear of the vehicle 12 in the vehicle cabin 14. Alternatively, the upper limit acceleration may be limited when the wheelchair 24 is not fixed to the vehicle 12 with the wheelchair fixing device 30. Further, the upper limit acceleration may be limited when the occupant P1 is not wearing the seatbelt 34.

Control when Seatbelt is Unfastened or Fixation of Wheelchair is Released During Traveling of Vehicle When the seatbelt 34 is unfastened or fixation of the wheelchair 24 is released while the vehicle 12 is traveling, there is a possibility that the seatbelt 34 cannot exhibit the performance of restraining the occupant P1 or the wheelchair 24 may move inside the vehicle cabin 14. Hereinafter, control of the vehicle 12 and output of a warning signal in consideration of that point will be described.

Figure 11:
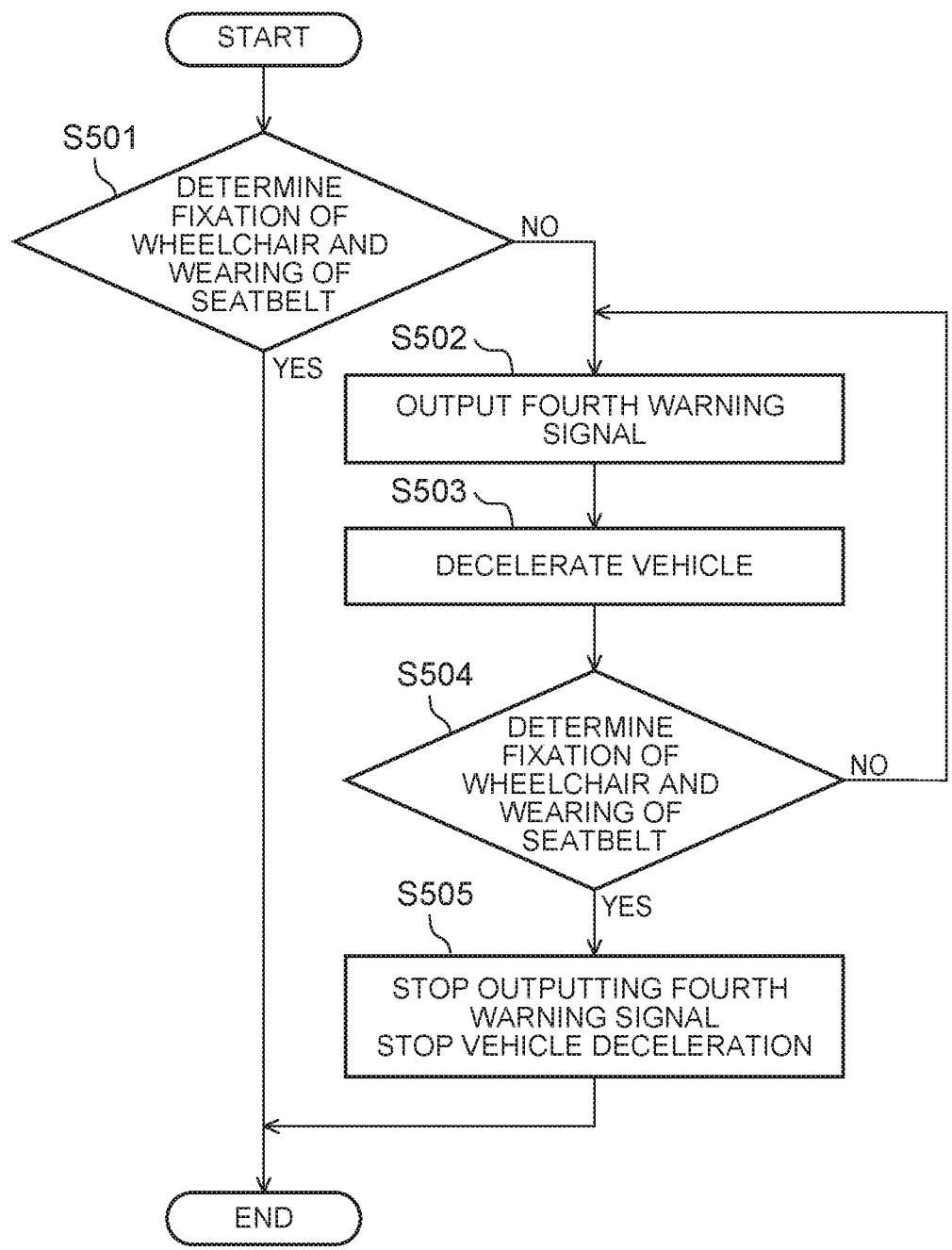
FIG. 11 is a flowchart illustrating the vehicle control by the vehicle interlock system in consideration of a case in which a seatbelt is unfastened or fixation of the wheelchair is released during traveling of the vehicle.

As shown in FIGS. 1, 3 and 11, during traveling of the vehicle 12, the ECU 52 determines whether the wheelchair 24 is fixed to the vehicle 12 with the wheelchair fixing device 30 and the occupant P1 seated in the wheelchair 24 is wearing the seatbelt 34 based on the signals from the wheelchair fixing detection switch 32 and the seatbelt wearing detection switch 38 (step S501).

When an affirmative determination is made in step S501, that is, when it is determined that the wheelchair 24 is fixed to the vehicle 12 with the wheelchair fixing device 30 and the occupant P1 seated in the wheelchair 24 is wearing the seatbelt 34, the ECU 52 ends the process.

When a negative determination is made in step S501, that is, when it is determined that the wheelchair 24 is not fixed to the vehicle 12 with the wheelchair fixing device 30, or the occupant P1 seated in the wheelchair 24 is not wearing the seatbelt 34, or the wheelchair 24 is not fixed to the vehicle 12 with the wheelchair fixing device 30 as well as the occupant P1 seated in the wheelchair 24 is not wearing the seatbelt 34, the ECU 52 outputs a fourth warning signal (step S502), and causes the vehicle 12 to decelerate (S503). In addition, based on the output of the fourth warning signal, the warning lamp 42 lights up and the buzzer 44 sounds, so that the occupant P1 is prompted to fix the wheelchair 24 and/or wear the seatbelt 34. A configuration may be adopted in which the buzzer 44 sounds after the warning lamp 42 lights up. Further, the output of the fourth warning signal causes the hazard lamps 48 (see FIG. 2) to flash. Thus, it is possible to alert people outside the vehicle 12 such as an occupant of the following vehicle.

After passage of a predetermined time following the start of deceleration in step S503, the ECU 52 again determines whether the wheelchair 24 is fixed to the vehicle 12 with the wheelchair fixing device 30 and the occupant P1 seated in the wheelchair 24 is wearing the seatbelt 34 (step S504).

When an affirmative determination is made in step S504, that is, when it is determined that the wheelchair 24 is fixed to the vehicle 12 with the wheelchair fixing device 30 and the occupant P1 seated in the wheelchair 24 is wearing the seatbelt 34, the ECU 52 stops outputting the fourth warning signal and stops the deceleration of the vehicle 12 (step S505), and ends the process.

When a negative determination is made in step S504, that is, when it is determined that the wheelchair 24 is not fixed to the vehicle 12 with the wheelchair fixing device 30, or the occupant P1 seated in the wheelchair 24 is not wearing the seatbelt 34, or the wheelchair 24 is not fixed to the vehicle 12 with the wheelchair fixing device 30 as well as the occupant P1 seated in the wheelchair 24 is not wearing the seatbelt 34, the ECU 52 continues to output the fourth warning signal (step S502), and continues the deceleration of the vehicle 12 (step S503). Thereby, the warning lamp 42 continues to light and the buzzer 44 continues to sound, so that the occupant P1 is prompted to fix the wheelchair 24 and/or wear the seatbelt 34. In addition, the hazard lamps 48 (see FIG. 2) continue to flash. Thus, it is possible to continue to alert people outside the vehicle 12 such as an occupant of the following vehicle.

Control Considering Autonomous Driving/Manual Driving Switchable Vehicle

Figure 12:
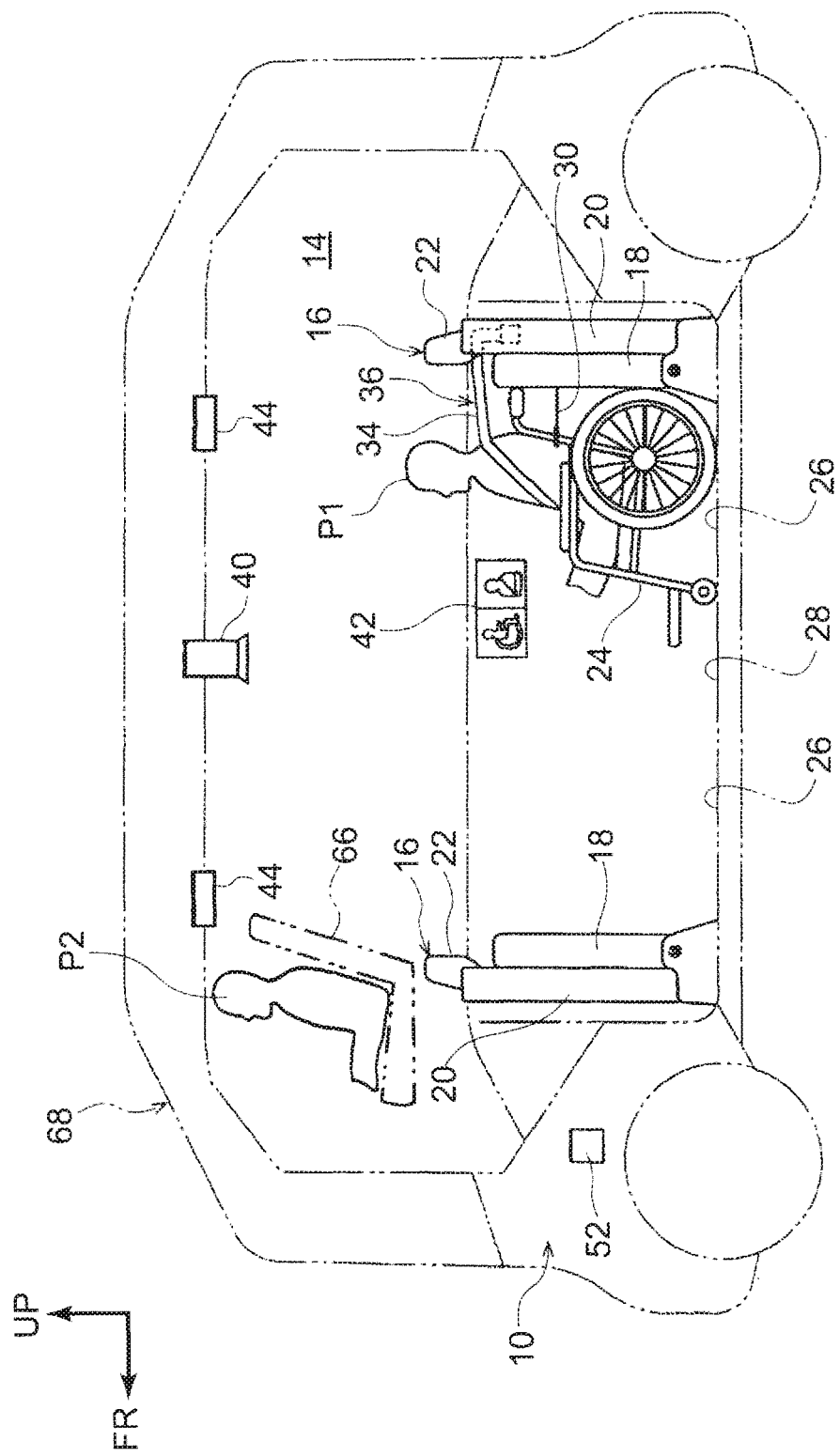
FIG. 12 is a side view, corresponding to FIG. 1, of a vehicle cabin of a vehicle that includes the vehicle interlock system and that can switch a driving mode between an autonomous driving mode and a manual driving mode, as seen in the vehicle width direction, showing a case in which the vehicle can travel in the manual driving mode.

FIG. 12 illustrates a vehicle 68 that can switch a driving mode between an autonomous driving mode and a manual driving mode. In the autonomous driving mode, the vehicle 68 can travel without driving operation by an occupant P2 in a driver seat 66. In the manual driving mode, the vehicle can travel with driving operation by the occupant P2 in the driver seat 66.

Here, in the case of the vehicle 68 that can switch the driving mode between the autonomous driving mode and the manual driving mode, the occupant P2 in the driver seat 66 can prompt the occupant P1 in the wheelchair 24 to fix the wheelchair 24 and/or wear the seatbelt 34 during manual driving. In addition, the occupant P2 in the driver seat 66 can adjust a traveling speed and an acceleration of the vehicle 68. Thus, when the vehicle 68 is traveling in the manual driving mode, only the control described with reference to FIG. 6 (outputting the warning signals) may be performed without performing the control of the vehicle 12 described with reference to FIG. 5 (control for limiting the upper limit traveling speed and the upper limit acceleration). When the occupant P2 in the driver seat 66 does not ride on the vehicle 68 and the vehicle 68 travels in the autonomous driving mode, the control described with reference to FIGS. 5 to 7 and FIG. 10 may be performed.

Figure 13:
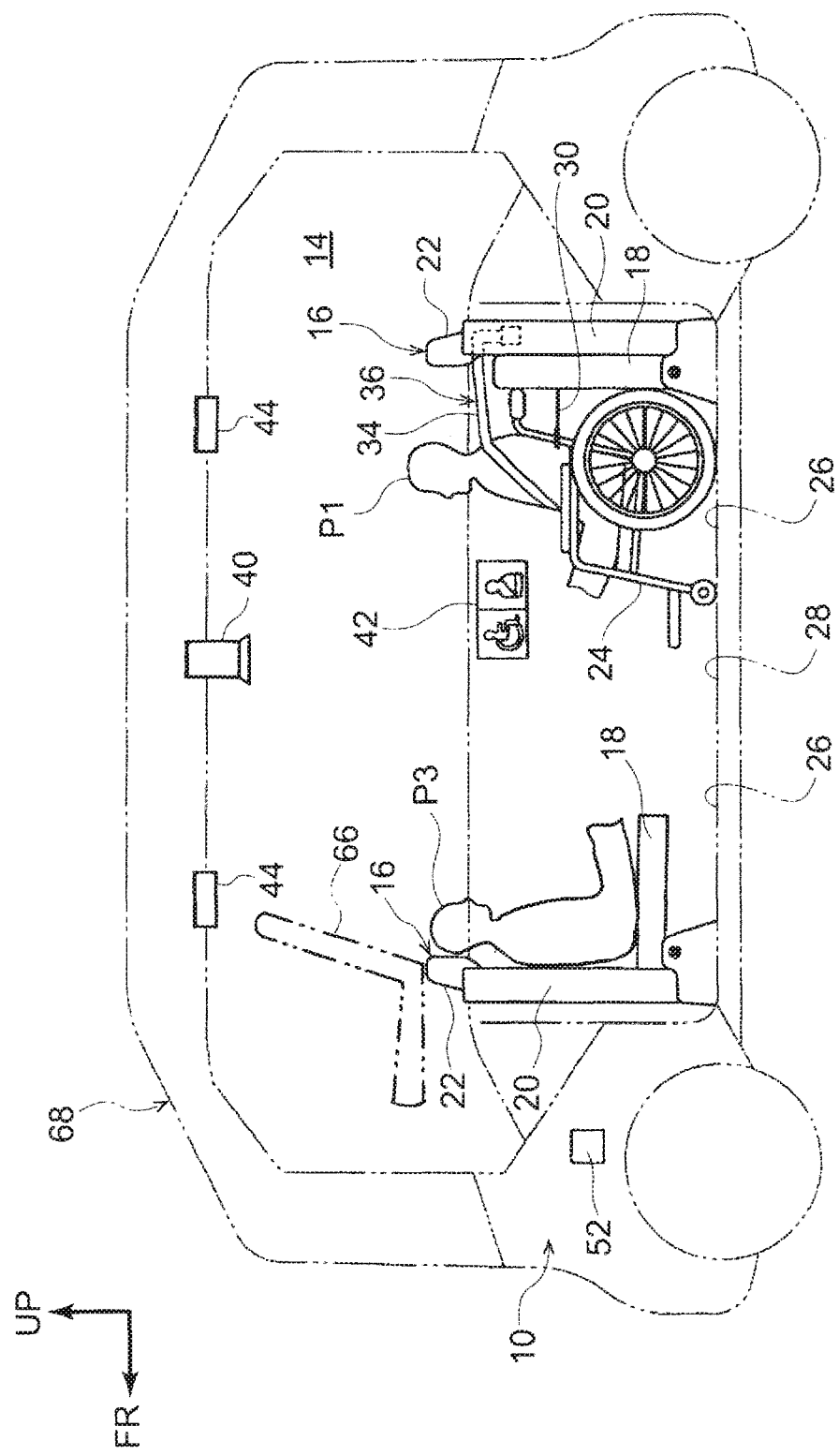
FIG. 13 is a side view, corresponding to FIG. 1, of the vehicle cabin of the vehicle that includes the vehicle interlock system and that can switch the driving mode between the autonomous driving mode and the manual driving mode, as seen in the vehicle width direction, showing a case in which the vehicle can travel in the autonomous driving mode.

Also, as shown in FIG. 13, when the occupant P2 in the driver seat 66 does not ride on the vehicle 68 but a cabin crew P3 rides on the vehicle 68, the cabin crew P3 can prompt the occupant P1 in the wheelchair 24 to fix the wheelchair 24 and/or wear the seatbelt 34 during autonomous driving. Thus, when the vehicle 68 is traveling in the autonomous driving mode and the cabin crew P3 is riding on the vehicle 68, only the control described with reference to FIG. 5 (outputting the warning signals) may be performed without performing the control of the vehicle 12 described with reference to FIG. 6 (control for limiting the upper limit traveling speed and the upper limit acceleration).

The embodiment of the disclosure has been described, but the disclosure is not limited to the above. Needless to say, for carrying out the disclosure, various modifications and combinations can be made beside the above embodiment without departing from the scope of the disclosure.

What is claimed is:

1. A vehicle interlock system comprising:
   a wheelchair fixing device provided in a vehicle cabin of a vehicle and configured to fix a wheelchair to the vehicle;
   a seatbelt device having a seatbelt configured to be worn by an occupant seated in the wheelchair; and
   a control unit;
   wherein the control unit is configured to:
   limit at least one of an upper limit traveling speed and an upper limit acceleration of the vehicle or output a warning signal, or to output the warning signal while limiting at least one of the upper limit traveling speed and the upper limit acceleration of the vehicle depending on at least one of the following conditions:
   (1) whether there is the wheelchair in the vehicle cabin;
   (2) which of a front and a rear of the vehicle the wheelchair is facing toward;
   (3) whether the wheelchair is fixed to the vehicle with the wheelchair fixing device; and
   (4) whether the occupant is wearing the seatbelt, and limit the upper limit acceleration such that an upper limit acceleration of the vehicle when the wheelchair is facing toward the rear of the vehicle is lower than an upper limit acceleration of the vehicle when the wheelchair is facing toward the front of the vehicle.

2. The vehicle interlock system according to claim 1, wherein the control unit is configured to limit the upper limit traveling speed such that an upper limit traveling speed of the vehicle when the wheelchair is not fixed to the vehicle with the wheelchair fixing device and the occupant is not wearing the seatbelt is lower than an upper limit traveling speed of the vehicle when the wheelchair is fixed to the vehicle with the wheelchair fixing device and the occupant is not wearing the seatbelt.

3. The vehicle interlock system according to claim 1, wherein the control unit is configured to limit the upper limit traveling speed such that an upper limit traveling speed of the vehicle when the wheelchair is not fixed to the vehicle with the wheelchair fixing device and the occupant is not wearing the seatbelt is lower than an upper limit traveling speed of the vehicle when the wheelchair is not fixed to the vehicle with the wheelchair fixing device and the occupant is wearing the seatbelt.

4. The vehicle interlock system according to claim 1, wherein the control unit is configured to limit the upper limit traveling speed such that an upper limit traveling speed of the vehicle when the wheelchair is not fixed to the vehicle with the wheelchair fixing device and the occupant is wearing the seatbelt is lower than an upper limit traveling speed of the vehicle when the wheelchair is fixed to the vehicle with the wheelchair fixing device and the occupant is wearing the seatbelt.

5. The vehicle interlock system according to claim 1, wherein the control unit is configured to limit the upper limit traveling speed such that an upper limit traveling speed of the vehicle when the wheelchair is fixed to the vehicle with the wheelchair fixing device and the occupant is not wearing the seatbelt is lower than an upper limit traveling speed of the vehicle when the wheelchair is fixed to the vehicle with the wheelchair fixing device and the occupant is wearing the seatbelt.

6. The vehicle interlock system according to claim 1, wherein the control unit is configured to limit the upper limit traveling speed such that an upper limit traveling speed of the vehicle when there is the wheelchair in the vehicle cabin is equal to or lower than an upper limit traveling speed of the vehicle when there is no wheelchair in the vehicle cabin.

7. The vehicle interlock system according to claim 1, wherein the control unit is configured to limit the upper limit acceleration such that an upper limit acceleration of the vehicle when the wheelchair is not fixed to the vehicle with the wheelchair fixing device and the occupant is not wearing the seatbelt is lower than an upper limit acceleration of the vehicle when the wheelchair is fixed to the vehicle with the wheelchair fixing device and the occupant is not wearing the seatbelt.

8. The vehicle interlock system according to claim 1, wherein the control unit is configured to limit the upper limit acceleration such that an upper limit acceleration of the vehicle when the wheelchair is not fixed to the vehicle with the wheelchair fixing device and the occupant is not wearing the seatbelt is lower than an upper limit acceleration of the vehicle when the wheelchair is not fixed to the vehicle with the wheelchair fixing device and the occupant is wearing the seatbelt.

9. The vehicle interlock system according to claim 1, wherein the control unit is configured to limit the upper limit acceleration such that an upper limit acceleration of the vehicle when the wheelchair is not fixed to the vehicle with the wheelchair fixing device and the occupant is wearing the seatbelt is lower than an upper limit acceleration of the vehicle when the wheelchair is fixed to the vehicle with the wheelchair fixing device and the occupant is wearing the seatbelt.

10. The vehicle interlock system according to claim 1, wherein the control unit is configured to limit the upper limit acceleration such that an upper limit acceleration of the vehicle when the wheelchair is fixed to the vehicle with the wheelchair fixing device and the occupant is not wearing the seatbelt is lower than an upper limit acceleration of the vehicle when the wheelchair is fixed to the vehicle with the wheelchair fixing device and the occupant is wearing the seatbelt.

11. The vehicle interlock system according to claim 1, wherein the control unit is configured to limit the upper limit acceleration such that an upper limit acceleration of the vehicle when there is the wheelchair in the vehicle cabin is equal to or lower than an upper limit acceleration of the vehicle when there is no wheelchair in the vehicle cabin.

12. The vehicle interlock system according to claim 1, wherein the control unit is configured to limit the upper limit acceleration only when the wheelchair is facing toward the rear of the vehicle.

13. The vehicle interlock system according to claim 12, wherein the control unit is configured to limit the upper limit acceleration when the occupant is not wearing the seatbelt.

14. The vehicle interlock system according to claim 12, wherein the control unit is configured to limit the upper limit acceleration when the wheelchair is not fixed to the vehicle with the wheelchair fixing device.

15. The vehicle interlock system according to claim 14, wherein the control unit is configured to limit the upper limit acceleration when the occupant is not wearing the seatbelt.

16. The vehicle interlock system according to claim 1, wherein a display unit is provided either on an outer side of the vehicle or in the vehicle cabin, or both, and the control unit is configured to cause the display unit to display a fact that at least one of the upper limit traveling speed and the upper limit acceleration of the vehicle is limited when at least one of the upper limit traveling speed and the upper limit acceleration of the vehicle is limited.

17. The vehicle interlock system according to claim 1, wherein a hazard lamp is provided on an outer side of the vehicle, and the control unit is configured to cause the hazard lamp to flash when at least one of the upper limit traveling speed and the upper limit acceleration of the vehicle is limited.

18. A vehicle interlock system according to claim 1,
wherein the vehicle is configured to switch a driving mode between an autonomous driving mode and a manual driving mode, the autonomous driving mode being a mode in which the vehicle travels without driving operation by an occupant in a driver seat, the manual driving mode being a mode in which the vehicle travels with driving operation by the occupant in the driver seat, and the control unit is configured to output the warning signal depending on at least one of the conditions without limiting the upper limit traveling speed and the upper limit acceleration of the vehicle when the vehicle is traveling in the autonomous driving mode and there is a cabin crew in the vehicle cabin.

19. The vehicle interlock system according to claim 1, wherein the vehicle is an autonomous driving vehicle configured to travel autonomously without driving operation by an occupant in the vehicle cabin.

20. A vehicle interlock system comprising:
a wheelchair fixing device provided in a vehicle cabin of a vehicle and configured to fix a wheelchair to the vehicle;
a seatbelt device having a seatbelt configured to be worn by an occupant seated in the wheelchair; and
a control unit configured to limit at least one of an upper limit traveling speed and an upper limit acceleration of the vehicle or output a warning signal, or to output the warning signal while limiting at least one of the upper limit traveling speed and the upper limit acceleration of the vehicle depending on at least one of the following conditions:
(1) whether there is the wheelchair in the vehicle cabin;
(2) which of a front and a rear of the vehicle the wheelchair is facing toward;
(3) whether the wheelchair is fixed to the vehicle with the wheelchair fixing device; and
(4) whether the occupant is wearing the seatbelt,
wherein the vehicle is configured to switch a driving mode between an autonomous driving mode and a manual driving mode, the autonomous driving mode being a mode in which the vehicle travels without driving operation by an occupant in a driver seat, the manual driving mode being a mode in which the vehicle travels with driving operation by the occupant in the driver seat, and the control unit is configure to limit at least one of the upper limit traveling speed and the upper limit acceleration of the vehicle depending on at least one of the conditions when the vehicle is traveling in the autonomous driving mode and output the warning signal depending on at least one of the conditions without limiting the upper limit traveling speed and the upper limit acceleration of the vehicle when the vehicle is traveling in the manual driving mode.

21. A vehicle interlock system comprising:
a wheelchair fixing device provided in a vehicle cabin of a vehicle and configured to fix a wheelchair to the vehicle;
a seatbelt device having a seatbelt configured to be worn by an occupant seated in the wheelchair; and
a control unit configured to limit at least one of an upper limit traveling speed and an upper limit acceleration of the vehicle or output a warning signal, or to output the warning signal while limiting at least one of the upper limit traveling speed and the upper limit acceleration of the vehicle depending on at least one of the following conditions:
(1) whether there is the wheelchair in the vehicle cabin;
(2) which of a front and a rear of the vehicle the wheelchair is facing toward;
(3) whether the wheelchair is fixed to the vehicle with the wheelchair fixing device; and
(4) whether the occupant is wearing the seatbelt, and
when it is determined that condition (1) is satisfied and conditions (3) and (4) are not satisfied, then the control unit limits at least one of the upper limit traveling speed and the upper limit acceleration of the vehicle.

* * * * *